US006653386B2

(12) United States Patent
Graf et al.

(10) Patent No.: US 6,653,386 B2
(45) Date of Patent: Nov. 25, 2003

(54) PREVENTING DISCOLORATION IN AN ELASTOMER RUBBER

(75) Inventors: Hans-Joachim Graf, Stratford (CA); Yuding Feng, Stratford (CA); Brenda Elliott, Stratford (CA); Graham Choonoo, Petersburgd (CA)

(73) Assignee: Cooper Technology Services, LLC, Findlay, OH (US)

( * ) Notice: Subject to any disclaimer, the term of this patent is extended or adjusted under 35 U.S.C. 154(b) by 0 days.

(21) Appl. No.: 10/011,152

(22) Filed: Dec. 7, 2001

(65) Prior Publication Data

US 2003/0125438 A1 Jul. 3, 2003

(51) Int. Cl.$^7$ .............................. C08J 3/00; C08K 5/10; C08L 51/00; C08G 63/48; C08G 63/91
(52) U.S. Cl. ...................... 524/425; 524/284; 524/394; 524/445; 525/70; 525/74
(58) Field of Search ................................. 524/425, 284, 524/394, 445; 525/70, 74

(56) References Cited

U.S. PATENT DOCUMENTS

| | | |
|---|---|---|
| 4,355,129 A | 10/1982 | Dams |
| 4,857,230 A | 8/1989 | Matsumura |
| 5,015,679 A | 5/1991 | Matsumura |
| 5,157,081 A | 10/1992 | Puydak et al. |
| 5,183,613 A | 2/1993 | Edwards |
| 5,502,112 A | 3/1996 | Peacock |
| 5,564,249 A | 10/1996 | Borys et al. |
| 5,753,063 A | 5/1998 | Sakakibara et al. |
| 5,798,413 A | * 8/1998 | Spelthann et al. |
| 6,110,546 A | 8/2000 | Honda et al. |

OTHER PUBLICATIONS

Jourdain, Eric P., "Compounding Parameters to Control the Iridescent Bloom in EPDM Body Sealing Applications", Presented at ACS Meeting, May 5–8, 1996, Montreal, Quebec Canada.

Gallez, V. and Jourdain, E., "Predicting Color Retention and Heat Resistance of EPR Compounds", May 13, 1998, International Rubber Conference Paris, France.

Jourdain, Eric P., "Controlling the Iridescent Bloom in EPDM Body Sealing Applications", Rubber World, Dec., 1996, vol. 215, No. 3, pp. 29–41.

Sugiura, M., et al., "Application of Sepiolite to Prevent Bleeding and Blooming for EPDM Rubber Composition", Jan. 27, 1996, Applied Clay Science 11 (1996) 89–97.

* cited by examiner

Primary Examiner—Patrick D. Niland
(74) Attorney, Agent, or Firm—Fay, Sharpe, Fagan, Minnich & McKee, LLP

(57) ABSTRACT

A process for producing a vulcanized elastomeric rubber composition that minimizes or eliminates the appearance of discoloration on the surface of the rubber, and the products formed from this process are disclosed. The process includes the incorporation of polar functional groups into the elastomeric rubber by grafting the functional groups onto a compound miscible in the rubber. It is believed that the polar functional groups increase the solubility of the compounds responsible for iridescence and blooming observed in vulcanized rubber and decrease their migration to the rubber surface. Additional techniques for reducing or eliminating undesirable discoloration in rubber are disclosed.

26 Claims, 2 Drawing Sheets

PREVENTING DISCOLORATION IN AN ELASTOMER RUBBER

FIELD OF THE INVENTION

The present invention relates to methods for preventing or minimizing discoloration of elastomer rubbers and the products formed thereby. More particularly, the present invention relates to the addition of polar functional groups to ethylene propylene elastomer rubbers to prevent discoloration, even after weathering and exposure to ozone.

BACKGROUND OF THE INVENTION

It is common in the motor vehicle industry to fashion extruded and molded elastomeric rubber parts for use in a variety of applications, including glass run channels, gaskets, hoses, wear strips and weather seals. Various elastomeric rubbers, such as ethylene-α-olefin elastomers, including ethylene-propylene-diene terpolymer (EPDM) rubbers and ethylene-propylene (EP) rubber, and styrene-butadiene copolymer rubber (SBR), have been used to form these rubber parts. These materials are favored by manufacturers because they are relatively inexpensive compared to other elastomers and generally exhibit the desired flexibility necessary for a number of applications as well as acceptable weatherability properties.

Ethylene-α-olefin elastomers, particularly ethylene-propylene-diene (EPDM) rubbers, are excellent all-purpose rubbers, especially suitable for a wide variety of automotive applications. As used herein, rubber is defined to mean a polymeric material that is capable of recovering from large deformations quickly and forcibly and is essentially insoluble in solvents. EPDM rubber is a rubber comprising ethylene and propylene repeating units with a smaller amount of diene units to effect crosslinking of the polymer chains.

In many formulations of EPDM rubber used in the automotive industry, various additives are incorporated into the base rubber. These additives can include carbon black and various processing oils. Carbon black is used as a filler and reinforcing agent and to improve ozone and UV-light resistance. Processing oils are used to reduce the viscosity of the rubber, which provides advantages in processing. The EPDM rubbers are typically cured using a sulfur or peroxide cure system. Sulfur cure systems are generally preferred since they are effective, inexpensive and require no special processing techniques.

While EPDM parts provide good performance in many automotive applications, they often suffer from surface discolorations. These surface discolorations include sulfur blooming, in which the sulfur or other curatives migrate to the surface of the molded or extruded part imparting a crystalline whitish film on the part surface, and iridescence (or "bronzing"), which is the phenomenon of "oil on water" color formation in carbon black filled rubber. Iridescence often manifests itself as a yellowish, greenish or bluish sheen on the part surface. As used herein, iridescence and bronzing are used interchangeably and both refer to this non-crystalline color formation on a rubber surface resulting from curatives or other additives migrating to the rubber surface. These surface discolorations grow more pronounced when the part is subjected to weathering, oxygen and ozone exposure.

The discoloration of EPDM parts by sulfur bloom or iridescence does not affect the physical properties of the part, but it is aesthetically displeasing to many in the automotive industry. Thus, various studies have been conducted in an attempt to eliminate or reduce this discoloration. The origin and mechanisms of iridescence and blooming are not fully understood. However, several factors have been found to affect the amount of discoloration exhibited by a sample. These factors include the identity and amount of fillers, the use of different accelerators and the curing conditions. Based on the identification of these factors, various approaches have been taken in an effort to reduce discoloration. The use of specific grades of sulfur as well as specific vulcanization accelerator compositions have shown modest success. However, a noticeable discoloration is still apparent in state of the art sulfur-vulcanized, oil and carbon black loaded EPDM rubbers after weathering and ozone exposure.

Thus a need exists for an EPDM rubber that shows no discoloration even after subjected to weathering and oxygen and ozone exposure.

SUMMARY OF THE INVENTION

The present invention is directed to a method of producing ethylene-α-olefin rubber compositions that do not exhibit iridescence, blooming or other discoloration phenomenon often associated with such rubbers, and the compositions formed thereby. The principle of the present invention is based on formulating the rubber, including a specific curing system, in a manner that has been found to reduce or eliminate the appearance of iridescence and other sheen phenomenon that has been observed in EPDM and other ethylene-α-olefin elastomers.

In a first aspect, the effect of varying the base rubber, accelerators, and cure conditions was investigated. It was determined that the use of a lower ethylene content EPDM will decrease the amount of iridescence in the final product. Preferably, an EPDM base compound containing less than 58% ethylene by weight is used. Likewise, a lower accelerator content will help to minimize iridescence. Preferably, less than 4 parts per hundred resin (phr) of total accelerator is incorporated into the rubbers of the present invention. In addition, a high degree of cure will also decrease iridescence. Preferably, cure time is greater than 5 minutes at 204° C.

In a second aspect, it was discovered that the addition of polar functional groups to the rubber prevented discoloration in a state of the art optimized EPDM rubber. It is believed that the groups increased the polarity of the compound, which increased the solubility of compounds responsible for iridescence and thus decreased their migration to the rubber surface. Preferably, the polar functional groups are grafted onto a non-polar compound, such as EPDM or ethylene-propylene rubber, which is then introduced into the base rubber composition. The non-polar compound is miscible with the base rubber, and allows the grafted polar functional groups to disperse within the base rubber. Alternatively, the polar functional groups may simply be monomer units in a polymer, such as a styrene-butadiene copolymer. It was found that the addition of maleic anhydride grafted polyethylene to the rubber composition nearly completely eliminated any discoloration on the surface of the cured rubber, even after ozone aging for 24 hours.

DETAILED DESCRIPTION OF THE PREFERRED EMBODIMENTS

Figure 1:
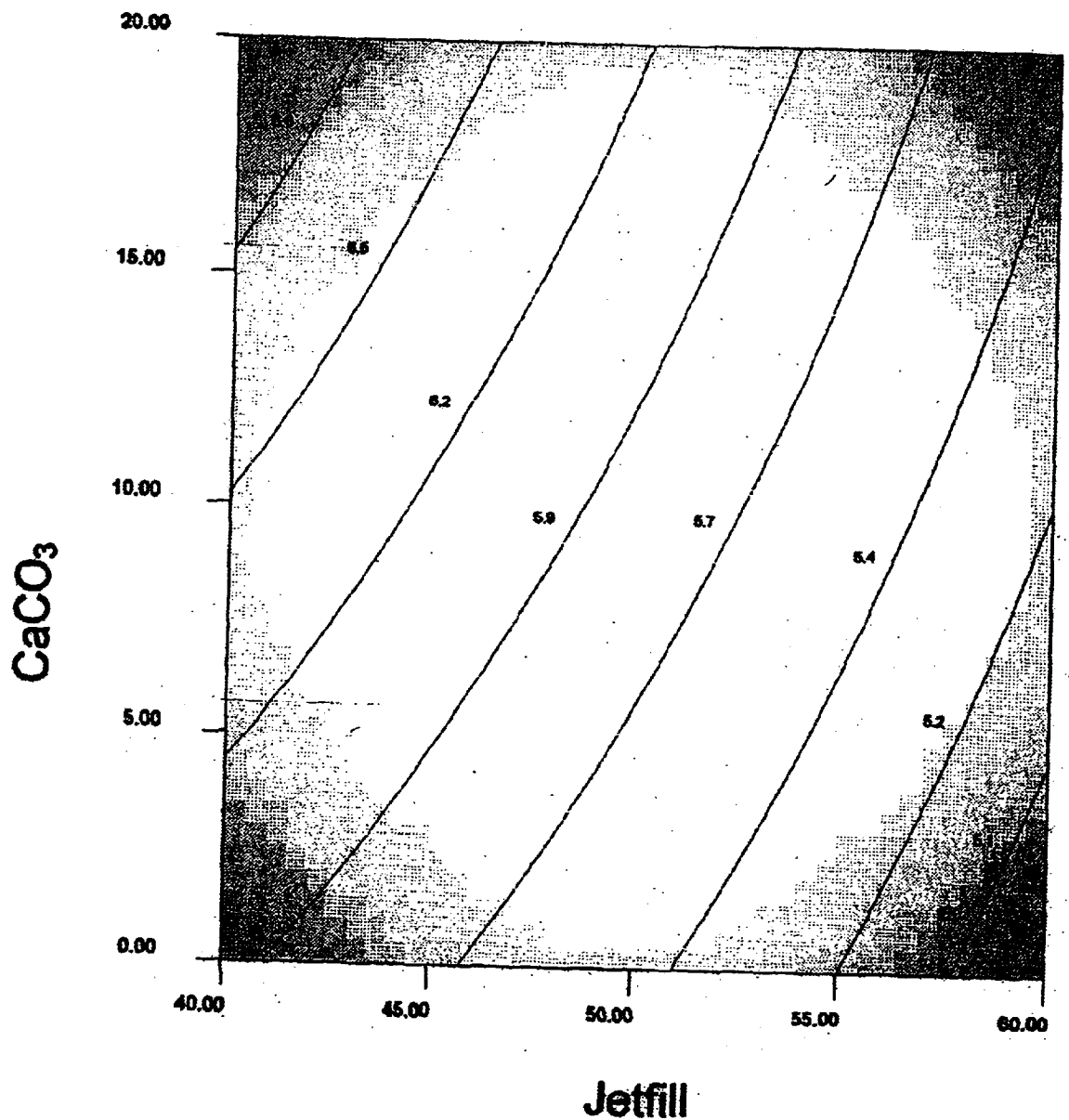
FIG. 1 is a graph depicting the dependence of discoloration in an EPDM sample on the concentration of $CaCO_3$ and clay filler.

The present invention relates to a method for preventing discoloration of elastomer rubber compounds and the resulting products. Specifically, the method is specifically tailored for reducing iridescence and blooming on the surface of carbon black filled rubber.

The present invention finds utility in any sulfur-cured, relatively non-polar elastomer rubber that is susceptible to blooming or iridescence. A preferred group of rubber compounds for use as the base compound in the present invention are ethylene-α-olefin-diene rubbers (EODM's). The EODM rubbers suitable for use in the present invention may comprise various monomers. Suitable α-olefins for use in the present invention are designated by the formula $CH_2$=CHR, where R is a hydrogen or alkyl of 1 to 12 carbon atoms. Suitable α-olefins include, but are not limited to, propylene, 1-butene, 1-pentene, 1-hexene, 1-octene and 1-decene. A referred α-olefin is polypropylene. Thus, a preferred group of EODM compounds suitable for the present invention are ethylene-propylene-diene terpolymer (EPDM) rubbers. Suitable dienes include, but are not limited to, nonconjugated dienes such as 1,4-pentadiene, 5-ethylidene-2-norbornene, cyclopentadiene, cyclohexadiene, and 5-butylidene-2-norbornene as well as other straight chain, cyclic and bridged cyclic dienes. A preferred EPDM for use as the base compound of the present invention is ethylene-propylene-ethylidene-norbornene terpolymer. EPDM will be used herein as the base compound as an example and for convenience in describing the invention. As stated previously, however, it is contemplated that other sulfur-cured elastomer rubbers may also be used.

The EPDM rubbers of the present invention are preferably cured using sulfur, a sulfur donor, and/or one or more cure accelerators. However, other cure systems are also contemplated by the invention. Examples of suitable sulfur donors and accelerators include, but are not limited to, tetramethylthiuram disulfide (TMTD), dipentamethylenethiuram tetrasulfide (DPTT), 2-mercaptobenzothiazole (MBT), 2-mercaptobenzothiazolate disulfide (MBTS), zinc-2-mercaptobenozothiazolate (ZMBT), zinc diethyidithiocarbamatezinc (ZDEC), zinc dibutyidithiocarbamate (ZDBC), dipentamethylenethiuram tetrasulfide (DPTT), tellurium diethyidithiocarbamate (TDEC), zinc dimethyldithiocarbamate (ZDMC), dithiodimorpholine (DTDM) and N-t-butylbenzothiazole-2-sulfonamide (TBBS).

The preferred EPDM rubbers may also include carbon black and processing oil in any concentration that does not adversely affect the properties of the final rubber composition in a significant manner. A typical concentration of carbon black is from about 130 to about 200 phr with a preferred range of about 140 to about 180 phr. Preferably, the processing oil to carbon black concentration ratio is about 0.4 to 0.6.

In addition to the high molecular weight EPDM, the carbon black, the processing oil and the cure system components, the EPDM rubbers produced according to the invention may contain various other ingredients in amounts that do not detract from the properties of the resultant composition. These ingredients can include, but are not limited to, activators such as zinc oxide and other metal oxides; fatty acids such as stearic acid and salts thereof; fillers and reinforces such as calcium or magnesium carbonate, silica, aluminum silicates, and the like; plasticizers and extenders such as dialkyl organic acids, naphthalenic and paraffinic oils and the like; antidegradants; softeners; waxes; and pigments.

The high molecular weight EPDM, along with the various curatives, accelerators and other components, are mixed using standard equipment and techniques known in the industry for a temperature and time necessary to obtain a uniform mixing. The blends may be accelerated on a mill and cured under typical vulcanization temperatures and time conditions.

In a first aspect, it was discovered that the selection of EPDM rubber that is used in a molded product can affect the degree of discoloration in the resulting final rubber composition. It was discovered that the use of higher ethylene content EPDM base rubber will increase iridescence in the final composition. Thus, preferably, an EPDM with less than 58% ethylene by weight is used as the base compound for the rubber compositions of the present invention.

In another aspect, the effect of particular fillers such as whitening agents on rubber discoloration was investigated. It was discovered that lowering the amount of $CaCO_3$ while increasing the amount of clay filler will decrease discoloration in the final rubber composition. Preferably, the amount of $CaCO_3$ in the final compound is about 0 to about 40 phr and the concentration of clay is from about 20 to about 80 phr. Most preferably, the amount of $CaCO_3$ in the final composition is about 0 to about 20 phr and the amount of clay is about 50 to about 70 phr.

In a third aspect, the effect of sulfur and total accelerator content on discoloration in the final compound was investigated. It was discovered that increasing sulfur will decrease discoloration while decreasing total accelerator content will also decrease discoloration. Preferably, a cure system comprising sulfur in an amount of about 1.0 to about 1.5 phr and total accelerators in an amount of about 2.0 to about 4.5 phr is used in the present invention.

In a fourth aspect, the effect of stearic acid concentration and accelerator identity on discoloration in the final composition was investigated. It was discovered that increasing the amount of stearic acid and the amount of DTDM in the composition decreased iridescence while the addition of TMTD, ZDBC and ZDMC tended to increase iridescence. Preferably, a cure system comprising sulfur in a concentration of about 1.0 to about 1.5 phr, DTDM (80%) at about 0.4 to about 1.0 phr, DPTT (67%) at about 0.5 to about 1.0 phr, MBTS (67%) at about 0.2 to about 0.6 phr and TDEC (67%) at about 1.2 to about 2.0 phr is used. Preferably, stearic acid is added to the rubber composition in a concentration of about 1.2 to about 2.0 phr.

In a fifth aspect, the effect of cure time on the amount of discoloration exhibited by the final rubber composition was investigated. It was discovered that samples with shorter cure times exhibited a higher degree of discoloration that those with longer cure times. Preferably, the final rubber compositions of the present invention are cured for longer than about 5 minutes at 204° C.

In a sixth aspect, the effect of the addition of polar polymers to the base composition on the discoloration of the final rubber composition was investigated. It was discovered that the addition of certain polar functional groups reduced discoloration in the final product. The polar functional groups are preferably grafted onto a polymer backbone and the resulting grafted polymer is subsequently introduced into the base rubber composition.

Any polymer that is miscible with the base rubber compound may be used as the backbone on which the polar functional groups may be grafted. Thus, when the base rubber compound is EPDM, suitable grafting polymers include, but are not limited to, polyethylene, polypropylene, ethylene propylene rubber (EP) and ethylene-α-olefin-diene rubber. All monomers mentioned previously as suitable for the thylene-α-olefin-diene rubber of the base compound are suitable for use n the grafting polymers as well.

Any polar functional group that is easily grafted to a polymer and hat will increase the solubility of the compounds responsible for iridescence and blooming are suitable for use in the present invention. Suitable functional groups include, but are not limited to, acrylic acid, acrylic acid ethyl ester, acrylic acid butyl ester, N-methylol-acrylimide, N-ethylol-acrylimide (and higher homologues of this class), allyl glycidylether, and maleic anhydride. Preferably, the polar group will be from about 3% to about 20% by weight of the entire grafted polymer.

A preferred polar functional group additive is maleic anhydride grafted polyethylene wherein the maleic anhydride comprises about 3.5% by weight of the compound. Preferably, the maleic anhydride grafted polyethylene is added to the base composition in a concentration of from about 1 phr to about 6 phr. Most preferably, it is added in a concentration of about 2 phr.

EXAMPLES

Various experimental trials were conducted to evaluate the effect of various additives on the discoloration present in a final cured EPDM rubber composition. The goal was to develop an EPDM rubber that exhibited no noticeable discoloration after cure and exposure to ozone.

The rubber compositions were mixed using a blender for a time necessary to obtain a uniform composition and then cured and cut into samples. The samples were put in an ozone chamber maintained at 40° C. and containing 100 pphm ozone for 24 hours. The samples were then inspected for signs of discoloration.

Samples were evaluated by a judge and sample discoloration was rated on a visual number scale. The amount of discoloration is not easily quantifiable and although the reported numbers are not the products of any numeric formulation, they are a qualitative indication of the amount of discoloration exhibited by particular samples. Thus, the lower the number assigned to a sample, the less discoloration exhibited by that sample, and vice versa. Some of the results in the trials of the present disclosure report discoloration of samples using this number scale. Other trials simply state the results in purely descriptive terms (i.e. more or less discoloration). When present, it should be remembered that a sample with a lower number represents a sample with less surface discoloration than a sample with a higher number.

The following examples are presented for the purpose of further illustrating the nature of the present invention and are not intended as a limitation of the scope thereof. It should be appreciated that the present invention is in no way restricted to the following examples.

Various EPDM based rubber compositions were prepared. Table 1 lists all the ingredients used in the various trials, the identity of the respective compounds and their manufacturer and/or supplier.

TABLE 1

Summary of Ingredients

| Ingredient | Compound Identity | Supplier |
|---|---|---|
| Vistalon 8609 | EPDM | ExxonMobil |
| Vistalon 8800 | EPDM | ExxonMobil |
| Buna EPT 6850 | EPDM | Bayer |
| Royalene 525 | EPDM | Uniroyal |
| Jetfill 625C | Kaolin clay | Lomas |
| Snowhite | $CaCO_3$ | Lomas |
| Flexon 815 | paraffinic oil | Imperial Oil Co. |
| TMTD - 67 | 67% tetramethylthiurame-disulfide | MLPC |
| TDEC-67 | tellurium diethyldithiocarbamate | MLPC |
| MBTS - 80 | 80% 2,2'-dithiobisbenzothiazole | MLPC |
| DPTT-67 | dipentamethylenethiuram tetrasulfide | MLPC |
| ZDMC-67 | zinc dimethyldithiocarbamate | MLPC |
| DTDM-80 | dithiomorpholine | MLPC |
| ZDBC - 70 | 70% zinc dibutyldithiocarbamate | MLPC |
| Zinc oxide - Activated | Sodium hexamethylene-1,6-bisthiosulfate dihydrate | Flexsys |
| Pristerene 9429 | Stearic acid | Lomas |
| Rhenosorb CG/W | Calcium oxide | RheinChemie |
| Pluriol E4000 | Polyethylene glycol | BASF |
| Zinc oxide - CR4 | zinc oxide | GHCHEM |
| Adland 8 | Maleic anhydride grafted polyethylene (3.5% MA by weight) | MLPC |
| Bayprene 111 | Chloroprene rubber | Bayer |
| Hypalon PC5850 | Chlorosulfonated polyethylene | DuPont |
| SBR 1551 | Styrene-butadiene rubber | Ameripol-Synpol |
| Carbon Black N550 | carbon black | Cabot |

Evaluation of Different Grades of EPDM

Trials were conducted in which several grades of EPDM rubber were used to formulate rubber compositions. The resulting compositions were then compared to determine the amount of discoloration displayed by each. The properties of the various grades of EPDM used in the trials are listed in Table 2.

TABLE 2

Properties of Selected EPDM's

| EPDM | $C_2^1$ | $ENB^2$ | $M_w^3$ | $MWD^4$ | $Oil^5$ |
|---|---|---|---|---|---|
| Vistalon 8609 | 62 | 8 | 95,000 | 2.47 | 0 |
| Buna EPT 6850 | 51 | 8 | 91,000 | 2.46 | 0 |
| Vistalon 8800 | 54 | 10 | 113,000 | 2.86 | 15 |
| Royalene 525 | 56 | 9 | N/A | N/A | 0 |

[1]Ethylene content (%)
[2]Ethylidene Norbomene content (%)
[3]Weight-average molecular weight
[4]Molecular weight distribution
[5]Oil content (%)

The formulations of the various rubber compositions used to determine the effect of different grades of EPDM are listed in Table 3. Vistalon 8609 is an EPDM currently used in production by many part manufacturers for various automotive applications. All concentrations are in parts per hundred resin (phr) unless otherwise specified.

TABLE 3

Formulation of Samples in EPDM Trials

| Compound | Production Sample | Sample A | Sample B | Sample C |
|---|---|---|---|---|
| Vistalon 8609 | 100 | — | — | — |
| Buna EPT 6850 | — | 100 | — | — |
| Vistalon 8800 | — | — | 115 | — |
| Royalene 525 | — | — | — | 100 |
| Carbon Black N550 | 165 | 177 | 165 | 120 |
| White fillers | 20 | 50 | 40 | 35 |
| ZnO | 6.95 | 3 | 4 | 5 |
| Pristerine 9429 | 1 | 0.25 | 1.5 | 1 |
| Rhenosorb CG/W | 10 | 4.2 | 4 | 6.5 |
| Pluriol E4000 | 2 | 0.5 | 1.5 | 2 |
| Sulfur | 0.3 | 0.3 | 0.26 | — |
| Flexon 815 | 80.5 | 105 | 83 | 70 |
| Sulfur - 70 | 1.83 | 1.90 | 1.00 | 0.50 |
| Accelerators | 3.70 | 3.70 | 3.70 | 3.70 |

It was found that sample B, utilizing Vistalon 8800, exhibited less discoloration than the production sample, utilizing Vistalon 8609. This indicated that the use of an EPDM having a relatively high ethylene content will increase the iridescence in the resulting rubber composition. Based on this result, Vistalon 8800 was used for all further testing trials.

Evaluation of White Fillers, Sulfur and Total Accelerator Concentration

Trials were conducted varying the amount of CaCO$_3$ (Snowhite 3), kaolin clay filler (Jetfill 625C), sulfur and total accelerators. The formulations used are listed in Table 4. The highlighted ingredients show the variables. All concentrations are in parts per hundred resin.

TABLE 4

Formulation of Samples in Filler, Sulfur and Accelerator Trials

| Ingredient | Phr |
|---|---|
| Vistalon 8800 | 115 |
| Carbon Black N550 | 165 |
| Jetfill 625C | 40–60 |
| Snowhite 3 | 0–20 |
| Zinc Oxide | 4 |
| Stearic acid | 1.5 |
| Pluriol E4000 | 1.5 |
| Rhenosorb CG/W | 4.1 |
| Flexon 815 | 79 |
| Sulfur | 0.5–1.5 |
| DPTT-67 | 0.35–0.53 |
| TMTD-67 | 0.59–0.87 |
| MBTS-67 | 0.36–0.53 |
| DTDM-80 | 0.29–0.42 |
| TDEC-67 | 0.21–0.31 |

When the amount of sulfur and total accelerators was held constant at 1.00 phr and 2.2 phr, respectively, it was discovered, as can be seen from FIG. 1, that increasing Jetfill decreases bronzing while increasing CaCO$_3$ increases bronzing. As will be recalled, the numbers plotted in FIG. 1 represent the degree of discoloration exhibited by the sample. The lower the number, the less discoloration.

Figure 2:
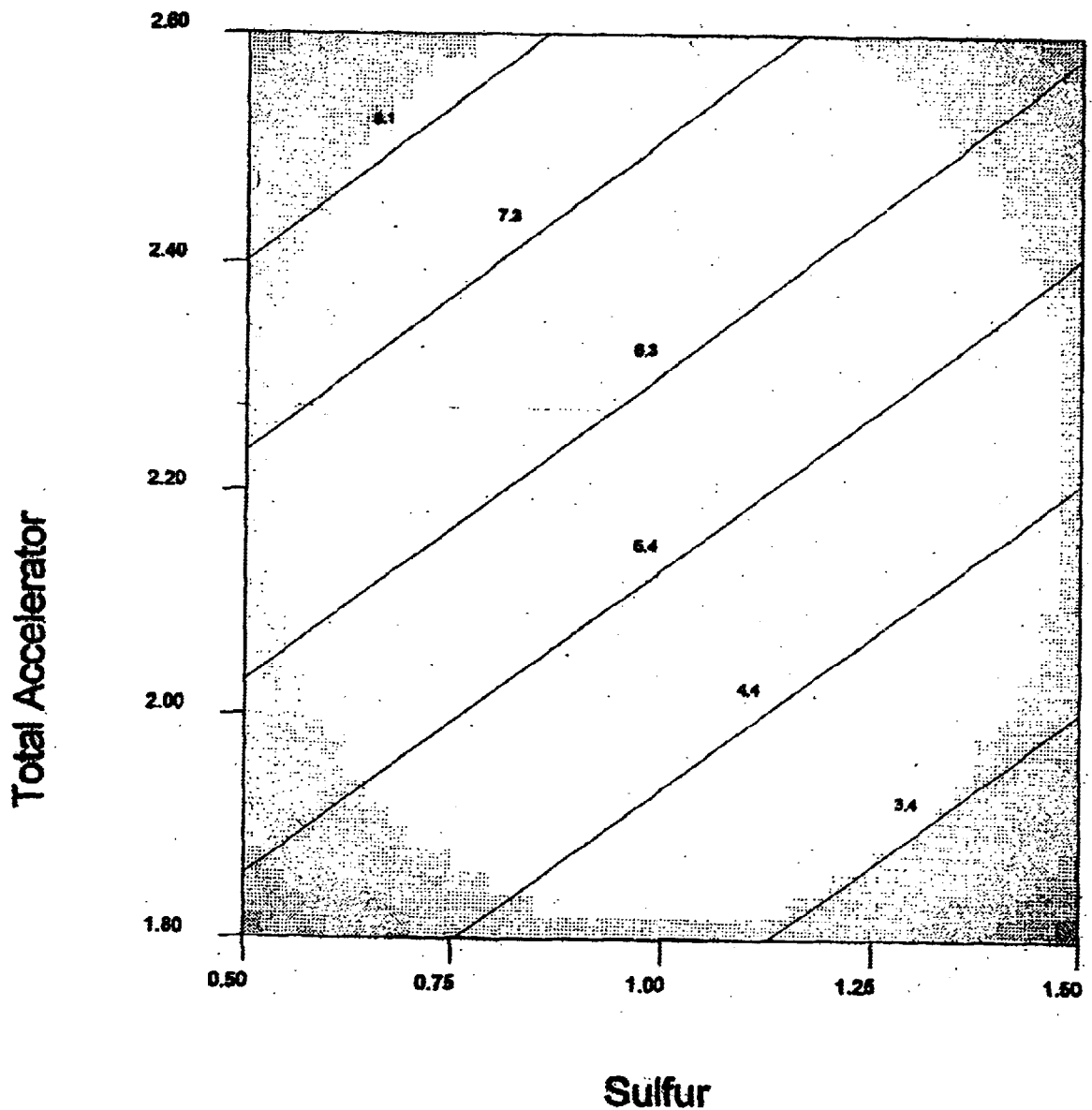
FIG. 2 is a graph depicting the dependence of discoloration in an EPDM sample on the concentration of sulfur and total accelerators.

When the amount of Jetfill and CaCO$_3$ is held constant at 50.0 and 10.0 phr, respectively, it was discovered, as can be seen in FIG. 2, that increasing sulfur decreases bronzing while increasing total accelerators increases bronzing. Similarly, the numbers plotted in FIG. 2 represent the degree of discoloration of the samples. The lower the number, the less discoloration exhibited by the sample.

Based on these results, future trials replaced Snowhite 3 with Jetfill 625C and utilized a lower concentration of accelerators.

Effect of State of Cure

The state of cure of the rubber was investigated and its effect upon the degree of iridescence in a final product. It was found that when the cure time is approximately 3 to 5 minutes, there is severe bronzing on the surface of the molded rubber. When the cure time is greater than 8 minutes, there is no bronzing on the surface.

Evaluation of Curatives

Trials were conducted using various accelerators in the cure system. The type of curative was investigated and its effect on the degree of discoloration. Table 5 lists the formulations used in the trials. The highlighted ingredients are the variables.

TABLE 5

Formulation of Samples in Cure System Trials

| Ingredient | Phr |
|---|---|
| Vistalon 8800 | 115 |
| Carbon Black N550 | 165 |
| Jetfill 625C | 60 |
| Zinc Oxide | 4 |
| Stearic acid | 0.25–1.75 |
| Pluriol E4000 | ta 1.5 |
| Rhenosorb CG/W | 4.1 |
| Flexon 815 | 79 |
| Sulfur | 0.30–1.30 |
| DPTT-67 | 0.50–1.00 |
| TMTD-67 | 0.00–0.70 |
| MBTS-67 | 0.00–0.50 |
| DTDM-80 | 0.00–0.50 |
| ZDBC-70 | 0.00–0.30 |
| ZDMC-67 | 0.00–0.40 |
| TDEC-67 | 0.21–0.31 |

It was discovered that higher concentrations of TMTD, ZDBC, and ZDMC greatly increase discoloration in the final rubber composition, while higher concentrations of stearic acid, sulfur, and DTDM decrease discoloration. It was discovered that bronzing is minimized when TMTD is close to zero and sulfur concentration is approximately 1.3 parts per hundred while holding the concentration of stearic acid at about 1.75 phr, DPTT at about 1.00 phr, DTDM at about 0.5 phr, MBTS at about 0.50 phr, TDEC at about 0.30 phr, and ZDBC and ZDMC at about 0.0 phr.

Moreover, in another aspect, the addition of zinc oxide was investigated and its effect on irridescence in the final rubber compound. Apparently, it is known that high surface specific active zinc oxide will improve the curative solubility and improve the state cure. In accordance with the present invention, active zinc oxide was utilized to replace normal zinc oxide CR-4. It was found that active zinc oxide does not decrease bronzing when compared to normal zinc oxide.

Evaluation of Addition of Polar Functional Groups to Rubber

In a further aspect, the addition of polar functional groups to the rubber formulations was investigated. The goal was to eliminate iridescence by adding a polymer which was still highly miscible with EPDM but possessed sufficient polarity (in the form of grafted polar groups) to increase the solubility of polar chemicals that contributed to iridescence. Four different polar additives were investigated. These were styrene-butadiene rubber (SBR 1551), chlorosulfonated polyethylene (Hypalon PC5850), chloroprene rubber (Bayprene 111) and maleic anhydride grafted polyethylene (Adland 8). The formulations used in the various trials are listed in Table 6.

TABLE 6

Formulation of Samples in Polar Group Trials

| Ingredient | Control Sample | Sample A | Sample B | Sample C | Sample D |
|---|---|---|---|---|---|
| Vistalon 8800 | 115 | 115 | 115 | 115 | 115 |
| SBR 1551 | — | 2, 4, 6 | — | — | — |
| Hypalon PC5850 | — | — | 2, 4, 6 | — | — |
| Bayprene 111 | — | — | — | 2, 4, 6 | — |
| Adland 8 | — | — | — | — | 2, 4, 6 |
| Carbon Black N550 | 165 | 165 | 165 | 165 | 165 |
| Jetfill 625C | 60 | 60 | 60 | 60 | 60 |
| Zinc oxide-CR4 | 4 | 4 | 4 | 4 | 4 |
| Stearic acid | 1.75 | 1.75 | 1.75 | 1.75 | 1.75 |
| Pluriol E4000 | 1.5 | 1.5 | 1.5 | 1.5 | 1.5 |
| Rhenosorb CG/W | 4 | 4 | 4 | 4 | 4 |
| Flexon 815 | 70 | 70 | 70 | 70 | 70 |
| Sulfur | 1.3 | 1.3 | 1.3 | 1.3 | 1.3 |
| DPTT-67 | 1 | 1 | 1 | 1 | 1 |
| MBTS-67 | 0.5 | 0.5 | 0.5 | 0.5 | 0.5 |
| DTDM-80 | 0.5 | 0.5 | 0.5 | 0.5 | 0.5 |
| ZDBC-70 | 0.5 | 0.5 | 0.5 | 0.5 | 0.5 |
| TDEC-67 | 0.3 | 0.3 | 0.3 | 0.3 | 0.3 |

It was discovered that chlorosulfonated polyethylene compounds had a deleterious effect upon bronzing. Such compounds caused severe bronzing on the surface of the molded rubber. Chloroprene rubber compounds were unacceptable as they caused a film on the surface of the molded rubber. Compounds with SBR were generally acceptable since the higher the SBR, the less the blue tint or color. Compounds comprising maleic anhydride grafted polyethylene were identified to be the best. Samples containing Adland 8 exhibited no discoloration on their surface, even after exposure in an ozone chamber for 24 hours.

As stated, the cured elastomer rubber compositions of the present invention may be used, in addition to other applications, to fashion molded and extruded rubber parts for the motor vehicle industry. The rubber compositions of the present invention may be used to make a variety of parts, including glass run channels, gaskets, hoses, weatherstrips and various seals.

One particularly useful application for the rubber compositions of the present invention is in the manufacture of glass run channels. Such a glass run channel will typically have a longitudinally extending main body member with a generally "U" shaped cross-sectional configuration having a bottom wall and two substantially vertical side walls. In addition, the glass run channel will preferably have at least one sealing lip to engage and seal against a vehicle window and at least one retention spur to hold the glass run channel securely in a vehicle door frame.

The foregoing description is, at present, directed to the preferred embodiments of the present invention. However, it is contemplated that various changes and modifications apparent to those skilled in the art may be made without departing from the present invention. Therefore, the foregoing description is intended to cover all such changes and modifications encompassed within the spirit and scope of the present invention, including all equivalent aspects.

What is claimed is:

1. An elastomer rubber composition that exhibits substantial freedom from discoloration after ozone, oxygen and weather exposure, said elastomer rubber composition comprising:
   a substantially non-polar elastomer rubber;
   a polymer miscible with said elastomer rubber, said polymer including one or more polar functional groups; and
   a cure system including sulfur, DTDM, DPTT, MBTS and TDEC.

2. The elastomer rubber composition of claim 1, wherein said substantially non-polar elastomer rubber is an ethylene-α-olefin-diene rubber.

3. The elastomer rubber composition of claim 2, wherein said ethylene-α-olefin-diene rubber is an ethylene-propylene-diene rubber.

4. The elastomer rubber composition of claim 1, wherein said polymer miscible with said elastomer rubber is selected from the group consisting of polyethylene, polypropylene, ethylene-propylene rubber, and ethylene-α-olefin-diene rubber.

5. The elastomer rubber composition of claim 1, wherein said polar functional group is selected from the group consisting of acrylic acid, acrylic acid ethyl ester, acrylic acid butyl ester, N-methylol-acrylimide, N-ethylol-acrylimide, allylglycidylether, and maleic anhydride.

6. The elastomer rubber composition of claim 5, wherein said polar functional group is maleic anhydride and said polymer miscible with said elastomer rubber is polyethylene.

7. The elastomer rubber composition of claim 1, wherein said polymer miscible with said elastomer rubber includes said polar functional groups at a concentration of from about 3% to about 20% by weight of said polymer.

8. The elastomer rubber composition of claim 1, wherein said cure system includes about 1.0 to about 1.5 phr sulfur, about 0.4 to about 1.0 phr DTDM, about 0.5 to about 1.0 phr DPTT, about 0.2 to about 0.6 phr MBTS and about 0.0 to about 0.4 phr TDEC.

9. The elastomer rubber composition of claim 1, wherein said cure system further includes about 1.2 to about 2.0 phr stearic acid.

10. The elastomer rubber composition of claim 1, further comprising about 130 to about 200 phr carbon black, about 20 phr to about 80 phr kaolin clay, and about 0 to about 40 phr CaCO$_3$.

11. The elastomer rubber composition of claim 1, further comprising about 1.2 to about 2.0 phr stearic acid.

12. An elastomer rubber composition that exhibits substantial freedom from discoloration after ozone, oxygen and weather exposure, said elastomer rubber composition comprising:
   an ethylene-α-olefin-diene rubber;
   a polymer miscible with said ethylene-α-olefin-diene base rubber, said polymer including one or more polar functional groups selected from the group consisting of maleic anydride, acrylic acid, acrylic acid ethyl ester, acrylic acid butyl ester, N-methylol-acrylimide, N-ethylol-acrylimide and higher homologues of N-ethylol-acrylimide, and allylglycidylether;
   about 130 to about 200 phr carbon black;
   about 1.2 to about 2.0 phr stearic acid;
   about 0 to about 40 phr CaCO$_3$;
   about 20 to about 80 phr clay;
   about 50 to about 120 phr processing oil; and a cure system comprising about 1.0 to about 1.5 phr sulfur, about 0.5 to about 1.0 phr dipentamethylenethiuram tetrasulfide (DPTT), about 0.2 to 0.6 phr 2-mercaptobenzothiazolate disulfide (MBTS), about 0.5 to about 1.0 phr dipentamethylenethiuram tetrasulfide (DPTT), and about 0.0 to about 0.4 phr tellurium diethyidithiocarbamate (TDEC).

13. A method for reducing or eliminating discoloration in a cured elastomer rubber composition, said method comprising the steps of:
providing an uncured ethylene-α-olefin-diene rubber having an ethylene content of less than 58% by weight;
providing a compound miscible with said elastomer rubber, said compound comprising polar functional groups;
mixing said compound with said uncured elastomer rubber to form an elastomer rubber composition; and
at least partially curing said elastomer rubber composition.

14. The method according to claim 13, wherein the step of providing a compound miscible with said elastomer rubber is performed by providing a maleic anhydride grafted polyethylene.

15. A weather strip that exhibits substantial freedom fro discoloration after exposure to ozone, said weather strip comprising an at least partially cured elastomer rubber composition that includes:
a substantially non-polar elastomer rubber; and
a polymer miscible with said elastomer rubber, said polymer including one or more polar functional groups.

16. A weather strip that exhibits substantial freedom from discoloration after ozone, oxygen and weather exposure, said weather strip comprising an at least partially cured elastomer rubber composition that includes:
an ethylene-α-olefin-dienebase rubber having an ethylene content of less than 58% by weight; and
a polymer miscible with said ethylene-α-olefin-diene base rubber, said polymer including one or more polar functional groups selected from the group consisting of maleic anydride, acrylic acid, acrylic acid ethyl ester, acrylic acid butyl ester, N-methylol-acrylimide, N-ethylol-acrylimide and higher homologues of N-ethylol-acrylimide, and allylglycidylether.

17. The weather strip according to claim 16, wherein the at least partially cured elastomer rubber composition further includes:
about 130 to about 200 phr carbon black;
about 1.2 to about 2.0 phr stearic acid;
about 0 to about 40 phr $CaCO_3$;
about 20 to about 80 phr clay;
about 50 to about 120 phr processing oil; and
a cure system comprising about 1.0 to about 1.5 phr sulfur, about 0.5 to about 1.0 phr dipentamethylenethiuram tetrasulfide (DPTT), about 0.2 to 0.6 phr 2-mercaptobenzothiazolate disulfide (MBTS), about 0.5 to about 1.0 phr dipentamethylenethiuram tetrasulfide (DPTT), and about 0.0 to about 0.4 phr tellurium diethyldithiocarbamate (TDEC).

18. A glass run channel that exhibits substantial freedom from discoloration after exposure to ozone, said glass run channel having a longitudinally extending main body member with a generally "U" shaped cross-sectional configuration with a bottom wall and two substantially vertical side walls, at least one sealing lip to engage and seal against a vehicle window, and at least one retention spur to hold the glass run channel securely in a vehicle door frame, further wherein the glass run channel comprises an at least partially cured elastomer rubber composition that includes:
a substantially non-polar elastomer rubber; and
a compound miscible with said elastomer rubber, said compound including one or more polar functional groups.

19. A glass run channel that exhibits substantial freedom from discoloration after ozone, oxygen and weather exposure, said weather strip comprising an at least partially cured elastomer rubber composition that includes:
an ethylene-α-olefin-diene rubber; and
a polymer miscible with said ethylene-α-olefin-diene base rubber, said polymer including one or more polar functional groups selected from the group consisting of maleic anydride, acrylic acid, acrylic acid ethyl ester, acrylic acid butyl ester, N-methylol-acrylimide, N-ethylol-acrylimide and higher homologues of N-ethylol-acrylimide, and allylglycidylether.

20. The glass run channel according to claim 19, wherein the at least partially cured elastomer rubber composition further includes:
about 130 to about 200 phr carbon black;
about 1.2 to about 2.0 phr stearic acid;
about 0 to about 40 phr $CaCO_3$;
about 20 to about 80 phr clay;
about 50 to about 120 phr processing oil; and
a cure system comprising about 1.0 to about 1.5 phr sulfur, about 0.5 to about 1.0 phr dipentamethylenethiuram tetrasulfide (DPTT), about 0.2 to 0.6 phr 2-mercaptobenzothiazolate disulfide (MBTS), about 0.5 to about 1.0 phr dipentamethylenethiuram tetrasulfide (DPTT), and about 0.0 to about 0.4 phr tellurium diethyldithiocarbamate (TDEC).

21. A vehicle seal that exhibits substantial freedom from discoloration after ozone, oxygen and weather exposure, said vehicle seal comprising an at least partially cured elastomer rubber composition that includes:
a substantially non-polar elastomer rubber;
a compound miscible with said elastomer rubber, said compound including one or more polar functional groups; and
a cure system including sulfur, DTDM, DPTT, MBTS and TDEC.

22. A vehicle seal that exhibits substantial freedom from discoloration after ozone, oxygen and weather exposure, said vehicle seal formed from an at least partially cured elastomer rubber composition that includes:
an ethylene-α-olefin-diene rubber having an ethylene content of less than 58% by weight; and
a polymer miscible with said ethylene-α-olefin-diene base rubber, said polymer including one or more polar functional groups selected from the group consisting of maleic anydride, acrylic acid, acrylic acid ethyl ester, acrylic acid butyl ester, N-methylol-acrylimide, N-ethylol-acrylimide and higher homologues of N-ethylol-acrylimide, and allylglycidylether.

23. The vehicle seal according to claim 22, wherein the at least partially cured elastomer rubber composition further includes, prior to vulcanization:
about 130 to about 200 phr carbon black;
about 1.2 to about 2.0 phr stearic acid;
about 0 to about 40 phr $CaCO_3$;
about 20 to about 80 phr clay;

about 50 to about 120 phr processing oil; and a cure system comprising about 1.0 to about 1.5 phr sulfur, about 0.5 to about 1.0 phr dipentamethylenethiuram tetrasulfide (DPTT), about 0.2 to 0.6 phr 2-mercaptobenzothiazolate disulfide (MBTS), about 0.5 to about 1.0 phr dipentamethylenethiuram tetrasulfide (DPTT), and about 0.0 to about 0.4 phr tellurium diethyidithiocarbamate (TDEC).

24. An elastomer rubber composition that exhibits substantial freedom from discoloration after ozone, oxygen and weather exposure, said elastomer rubber composition comprising:

an ethylene-α-olefin-diene rubber having an ethylene content of less than 58% by weight; and a polymer miscible with said rubber, said polymer including one or more polar functional groups.

25. The elastomer rubber composition of claim 24, wherein said polymer miscible with said elastomer rubber is selected from the group consisting of polyethylene, polypropylene, ethylene-propylene rubber, and ethylene-α-olefin-diene rubber.

26. The elastomer rubber composition of claim 24, wherein said polar functional group is selected from the group consisting of acrylic acid, acrylic acid ethyl ester, acrylic acid butyl ester, N-methylol-acrylimide, N-ethylol-acrylimide, allylglycidylether, and maleic anhydride.

* * * * *